United States Patent
Osborn et al.

(10) Patent No.: US 12,067,568 B2
(45) Date of Patent: Aug. 20, 2024

(54) AUTHENTICATION OF CONTACTLESS TRANSACTIONS

(71) Applicant: Capital One Services, LLC, McLean, VA (US)

(72) Inventors: Kevin Osborn, Newton Highlands, MA (US); Michael Wolf, Ellicott City, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 99 days.

(21) Appl. No.: 17/888,830

(22) Filed: Aug. 16, 2022

(65) Prior Publication Data

US 2024/0062206 A1 Feb. 22, 2024

(51) Int. Cl.
G06Q 20/40 (2012.01)
G06Q 20/34 (2012.01)
H04W 4/80 (2018.01)

(52) U.S. Cl.
CPC ..... *G06Q 20/40145* (2013.01); *G06Q 20/341* (2013.01); *G06Q 20/352* (2013.01); *H04W 4/80* (2018.02)

(58) Field of Classification Search
None
See application file for complete search history.

(56) References Cited

U.S. PATENT DOCUMENTS

| 9,544,075 | B2 | 1/2017 | Altman et al. |
| 10,075,919 | B2 | 9/2018 | Alameh et al. |
| 10,467,624 | B2 | 11/2019 | Schlesinger et al. |
| 10,484,386 | B2 | 11/2019 | Storr |
| 10,511,443 | B1 | 12/2019 | Newman et al. |
| 10,659,439 | B2 | 5/2020 | Sprague et al. |
| 10,902,108 | B2 | 1/2021 | Haworth et al. |
| 10,904,748 | B2 | 1/2021 | Jimenez et al. |

(Continued)

FOREIGN PATENT DOCUMENTS

GB 2545739 A * 6/2017 ......... G06K 19/0718

OTHER PUBLICATIONS

Notification of Transmittal of the International Search Report and the Written Opinion of the International Searching Authority issued in PCT/US2023/30130, mailed Dec. 18, 2023, 15 pages.

*Primary Examiner* — Kristy A Haupt
(74) *Attorney, Agent, or Firm* — HUNTON ANDREWS KURTH LLP (57) ABSTRACT

Disclosed embodiments include aspects that relate to authentication of contactless interactions. Identifying information can be provided from multiple sources. A chip-embedded card can be registered to an individual and include identifying information associated with the information. During a contactless transaction, identifying information can be acquired. An individual's identity can be validated based on identifying information. A chip-embedded card can be read by a card reader at a particular location providing physical presence information. In one instance, identifying information from the chip-embedded card can be compared to other identifying information to determine whether there is a match or mismatch. A confidence score can be computed based on the amount and type of information provided. An individual's identity can be validated when the confidence score satisfies a threshold.

19 Claims, 9 Drawing Sheets

(56) References Cited

U.S. PATENT DOCUMENTS

| | | |
|---|---|---|
| 11,019,063 B2 | 5/2021 | Legault et al. |
| 11,062,290 B2 | 7/2021 | Finch et al. |
| 2010/0135542 A1 | 6/2010 | Keepper et al. |
| 2012/0303483 A1 | 11/2012 | Lee et al. |
| 2012/0313754 A1 | 12/2012 | Bona |
| 2019/0026722 A1 | 1/2019 | Wu |
| 2020/0074437 A1 | 3/2020 | Bonsi |

\* cited by examiner

AUTHENTICATION OF CONTACTLESS TRANSACTIONS

BACKGROUND

Identity verification is important in many social interactions to establish a level of trust and connection between individuals. Unfortunately, close contact is not always possible, often leading to challenging circumstances in establishing identity and trust. For example, with the increased reliance on social distancing, traditional close contact is impossible. Social distancing refers to standards intended to mitigate or prevent the transmission of contagious diseases, usually by maintaining physical distance between individuals. In recent examples, that optimal distance has settled upon a standard of six feet (or 2 meters) to mitigate or prevent disease transmission effectively. Additionally, social distancing also refers to measures that usually promote avoidance of gathering together in large groups.

Disease transmission can be suppressed by minimizing the probability that an infected individual will come into physical contact with an uninfected individual. Unfortunately, the physical distance between individuals and occasional mask-wearing to curb disease spread creates difficulty in identity verification.

Moreover, because much of today's interactions are accomplished via text messaging (e.g., SMS (short message service) and IM (instant messaging), visual identity verification is not often possible. Identity verification to establish trust and connection is increasingly important in today's technologically changing world.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description presented later.

According to one aspect, disclosed embodiments can include a system that comprises a processor coupled to a memory that includes instructions that, when executed by the processor, cause the processor to register a chip-embedded card that includes first identity data of an individual, request, during a contactless transaction, second identity data regarding the individual from a computing device, in which the second identity data comprises at least one of biometric data, a timestamp, or geolocation of the computing device, and read from the chip-embedded card the first identity data comprising at least one of biometric data, timestamp, or geolocation data of the chip-embedded card. Further, the instructions can cause the processor to compare the first identity data and the second identity data and authenticate an identity of the individual for the contactless transaction based on a result of the compare when a match exists between the first identity data and the second identity data. In one instance, the chip-embedded card is read by a contactless card reader. Further, the geolocation data can comprise proximity data determined by short-range wireless technology triangulation or fencing. The biometric data can comprise a fingerprint, facial scan, voiceprint, or photo or video of the individual. The instructions can further cause the processor to collect the second identity data in response to the request from one or more computing devices. Further, the instruction can cause the processor to compute a confidence score based on the first identity data and the second identity data and determine the match when the confidence score satisfies a predetermined threshold. Furthermore, the predetermined threshold can be based on requested data or a type of contactless transaction.

In accordance with another aspect, disclosed embodiments can include a method comprising executing, on a processor, instructions that cause the processor to perform operations associated with contactless authentication. The operations include requesting first identity data from an individual associated with a contactless interaction and requesting presentation of a chip-embedded card registered to the individual and comprising second identity data associated with the individual, comparing the first identity data and the second identity data. Further, the operations comprise determining physical location based on at least one of the first identity data and the second identity data and validating the identity of the individual when a result of the comparing operation is a match, and the physical location is within a predetermined distance from another individual engaging in the contactless interaction. The operations further comprise determining the match when similarity between the first identity data and the second identity data satisfies a predetermined threshold. Further, the operations comprise determining a confidence score based on the first identity data and the second identity data, in which the confidence score captures quantity and strength of provided identity data. The operations can also comprise preventing validation of the identity when the confidence score satisfies a predetermined threshold and preventing validation when the confidence score satisfies a predetermined threshold determined based on a type of interaction or requested data. The operations can further comprise reading the chip-embedded card with a contactless reader and requesting the first identity data from a smartphone. Further, the operations can comprise determining the physical location based on global positioning system coordinates associated with a smartphone. Furthermore, the operations can comprise extracting the physical location from metadata of one of an image or video provided by a smartphone as first identity data and determining the physical location from proximity data associated with short-range wireless technology triangulation or fencing.

According to yet another aspect, disclosed embodiments can include a computer-implemented method. The method can comprise receiving first identity information from a smartphone of an individual associated with a contactless interaction, acquiring second identity information from a chip-embedded card for an individual from a contactless card reader, determining a location of the individual based on at least one of location information from the first identity information or a location of the contactless card reader, comparing the first identity information to the second identity information to determine whether there is a match or mismatch, determining a confidence score based on an amount and type of identity information available when there is a match, and authenticating an identity of the individual when the confidence score satisfies a predetermined threshold and the location is a predetermined distance from another entity engaging in the contactless interaction. The computer-implemented method can further comprise authenticating the identity of the individual when the confidence score satisfies a predetermined threshold that is based on a type of interaction.

To the accomplishment of the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

With a need to maintain social distancing, situations requiring physical presence can benefit from the ability to establish the identity of individuals in contactless or socially distant transactions or interactions. Depending on the context of the transaction, a combination of factors can be used to establish the identity of the individuals while maintaining social distancing. An electronic device can be employed to transmit data or requests for data to authenticate identity in contactless transactions.

Details disclosed herein generally pertain to establishing the identity of individuals in contactless transactions (e.g., authentication for contactless transactions or interactions). Contactless transactions are in-person transactions that maintain social distancing such that individuals can transact at a distance (e.g., 6 feet or 2 meters apart). Electronic devices can be employed to establish the identity of individuals. For example, electronic devices can be used to capture or transmit photos or videos of individuals taken during a transaction to establish identity based on biometric data (e.g., via facial scan or facial recognition, voiceprint or voice recognition) and timestamp to validate the physical presence of the individuals during a transaction. Biometric data can comprise fingerprint, facial scan, or voiceprint, which can be used to establish the identity of individuals. Biometric data can be captured through an electronic device with a fingerprint scanner or a camera for taking photos or videos.

One or more embodiments herein can include using a chip-embedded card (e.g., chip-enabled card) to further establish the identity of individuals in contactless transactions. Individuals can be provided with chip-embedded cards that are registered to the individuals with authentication data (e.g., identity information, biometric data) of the individuals. Chip-embedded cards can be used during contactless transactions to validate physical presence of the contactless transactions. The chip-embedded cards are physically read (e.g., with a contact or contactless card reader) during transactions that require physical presence, therefore also providing validation of physical presence. Additionally, the chip-embedded cards can provide timestamp and geolocation data at the time and location when the card is read. Thus, the chip-embedded cards can provide an additional source of data points that can be used in combination with other data points to establish the identity of the individuals.

Depending on the context of the transactions, a combination of factors (e.g., a mesh of trust or a collection of data) can be used to establish the identity of individuals in contactless transactions while maintaining social distancing. For example, timestamp and geolocation data can be used to validate individuals' physical presence at the transaction time. Geofencing can be used to alert an individual or a servicer (e.g., a person or a machine) of the presence of one another in the vicinity. Bluetooth Low Energy beacon triangulation can be employed to calculate the distance between an individual and a servicer through respective devices. Biometric data such as facial recognition of facial biometric pattern or voice recognition of voiceprint can also be used to confirm the individuals' identity and validate the individuals' physical presence if the biometric data such as photos and videos are taken during a transaction. For example, photos and videos can provide metadata such as the time and location of the photos or videos. Facial recognition and voice recognition can be employed to identify individuals. Audio clips can also be recorded for voice recognition instead of using videos. Individuals transacting together can also see each other, and electronic devices can assist, such as providing zooming options through camera lenses. In addition, proximity data can also be determined to provide validation (e.g., confirmation) of physical presence. Proximity data can estimate the physical proximity between individuals or devices through information derived from Bluetooth Low Energy beacon triangulation, geofence, or Wi-Fi.

Examples of transactions that can benefit from the ability to establish the identity of individuals from a distance can include, but are not limited to, getting a state identification card or driver's license, notarizing documents, identifying delivery person, identifying customers, and signing documents such as mortgage closings. Contactless transactions can be authenticated with confidence by using a combination of data points. Transactions such as signing documents for a mortgage closing can require a higher confidence score and more data points than a delivery service of ordinary goods.

Figure 1:
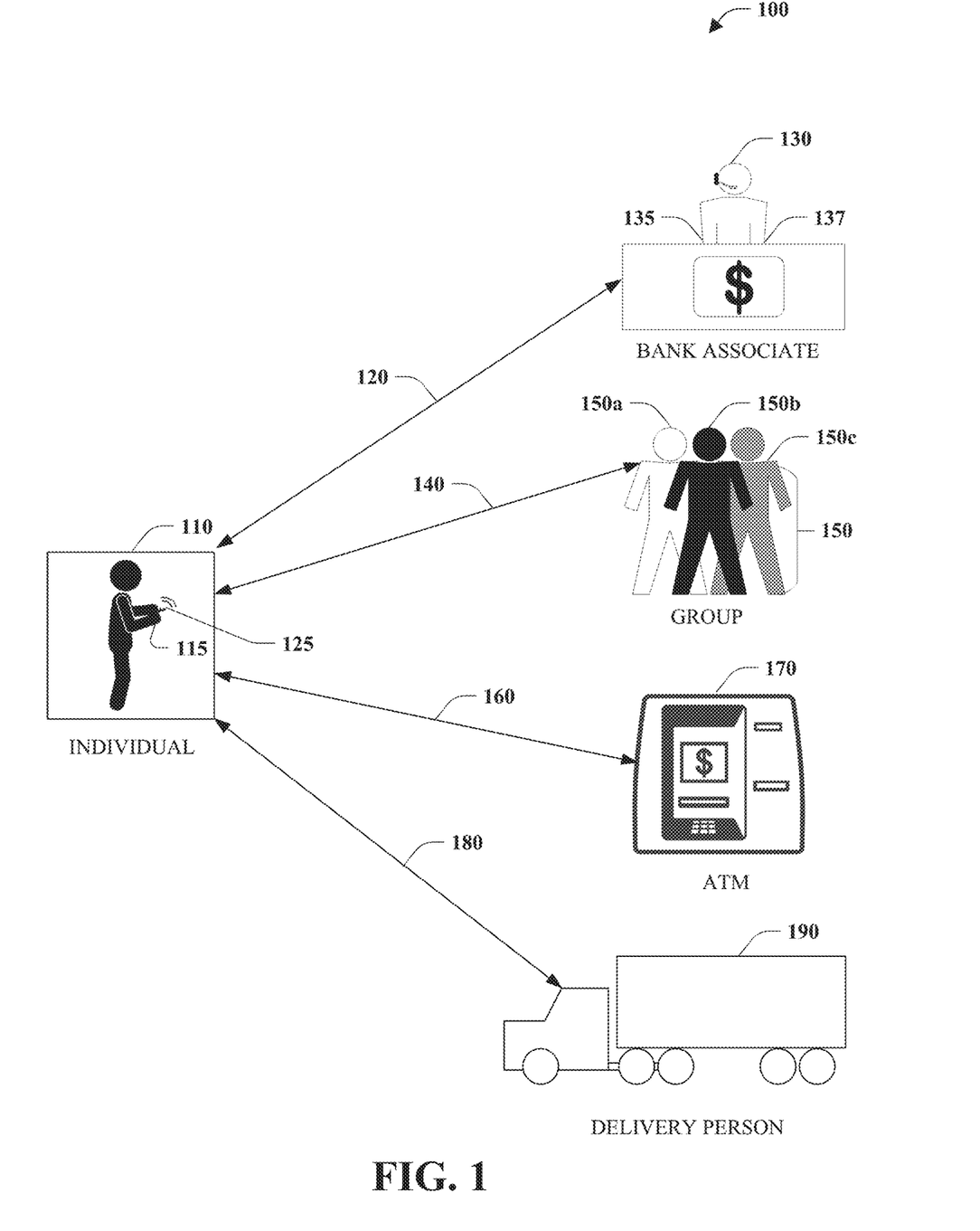
FIG. 1 illustrates an overview of an example implementation.

Referring to FIG. 1, an overview of an example implementation 100 is illustrated. FIG. 1 illustrates the individual 110 in four separate contactless transactions, wherein the individual 110 is using an electronic device 125 to interact directly with one or more individuals or servicers in the contactless transactions 120, 140, 160, and 180. The one or more individuals or servicers can be associated with one or more electronic devices used in the contactless transactions. For example, the individual 110 and the one or more individuals or servicers can transmit data and request data using their respective electronic devices.

The individual 110 and the one or more individuals or servicers can be provided with respective chip-embedded cards registered to the individuals or servicers. The chip-embedded cards can be registered with identity information (e.g., name, address, birthdate) of the individuals associated with the chip-embedded cards. If the chip-embedded cards are available during a transaction, the chip-embedded cards can provide additional data points to validate that the individuals associated with the chip-embedded cards are physically present for the contactless transaction.

For example, the individual 110 can be provided with a chip-embedded card 115. The chip-embedded card 115 can be registered to the individual 110 comprising the identity information of the individual 110. If the chip-embedded card 115 is accessible (e.g., available or present) during a contactless transaction, the electronic device 125 can read the chip-embedded card 115 for the identity information registered in the chip-embedded card 115. In reading the chip-embedded card 115, the timestamp and geolocation data can also be collected to provide an additional data point for identity verification and validation of physical presence during the contactless transaction.

Servicers, such as bank associate 130, can also be provided with a chip-embedded card, such as chip-embedded card 135, so that the individual 110 can authenticate or verify the identity of the bank associate 130. It is contemplated that the bank associate 130 can be provided with the chip-embedded card 135 to use while on duty and under individual capacity. It is contemplated that the bank associate 130 can be provided with another chip-embedded card for use while under individual capacity and additional chip-embedded cards for use in other employments.

In contactless transaction 120, the individual 110 transacts or interacts directly with the bank associate 130. The individual 110 and bank associate 130 can communicate using their respective electronic devices. Data or requests for data can be transmitted between the individual 110 and bank associate 130 via their respective electronic devices. For example, the individual 110 can transmit data or requests for data to the electronic device 137 for the bank associate 130 via the electronic device 125. Just as the individual 110 needs to provide identity verification to the bank associate 130 to receive service, the individual 110 can also request data from the bank associate 130 to be assured of who is providing service.

At times, a transaction can involve multiple parties. Contactless transaction 140 illustrates the individual 110 transacting with a group 150. The individual 110 can interact directly with the group 150. The individual 110 and the group 150 can communicate using their respective electronic devices. The group 150 can share one device or the individuals in the group 150 can have their own device. For example, individual 150*a*, individual 150*b*, and individual 150*c* can have their own respective electronic devices. Data or requests for data can be transmitted between the individual 110 and the group 150 via their respective electronic devices. The individual 110 can request data from the individual 150*a*, the individual 150*b*, and the individual 150*c*, or vice versa. The individuals 150*a*, 150*b*, and 150*c* can have chip-embedded cards assigned to them that can be read to transmit data to the individual 110.

A transaction can also be with a machine. For example, in contactless transaction 160 (e.g., with contact with another individual), the individual 110 transacts with an ATM (automated teller machine) 170. In transactions with machines, such as in contactless transaction 160, the transaction can be done on the machine itself. For example, in contactless transaction 160, the individual 110 can enter data directly into the ATM 170 without using the electronic device 125. The ATM 170, or another servicer that is a machine, can have similar components as those in the electronic device 125. For example, the ATM 170 can have a data collection component that can collect data (e.g., identity information, biometric data, timestamp, geolocation data, and proximity data) and a card reader for reading the chip-embedded card 115.

In contactless transaction 180, the individual 110 interacts directly with delivery person 190. The individual 110 and delivery person 190 can communicate using their respective electronic devices. Data or requests for data can be transmitted between the individual 110 and delivery person 190 via their respective electronic devices. The individual 110 can use the electronic device 125 to transmit data to the delivery person 190 or to request data from the delivery person 190. Geolocation data can be shared between devices such that the individual 110 can be informed when the delivery person 190 is within a predetermined distance or that the delivery person 190 is informed that the individual is nearby upon reaching the delivery location. A chip-embedded card can be registered to the delivery person 190 and include the vehicle information that the delivery person 190 uses.

Figure 2:
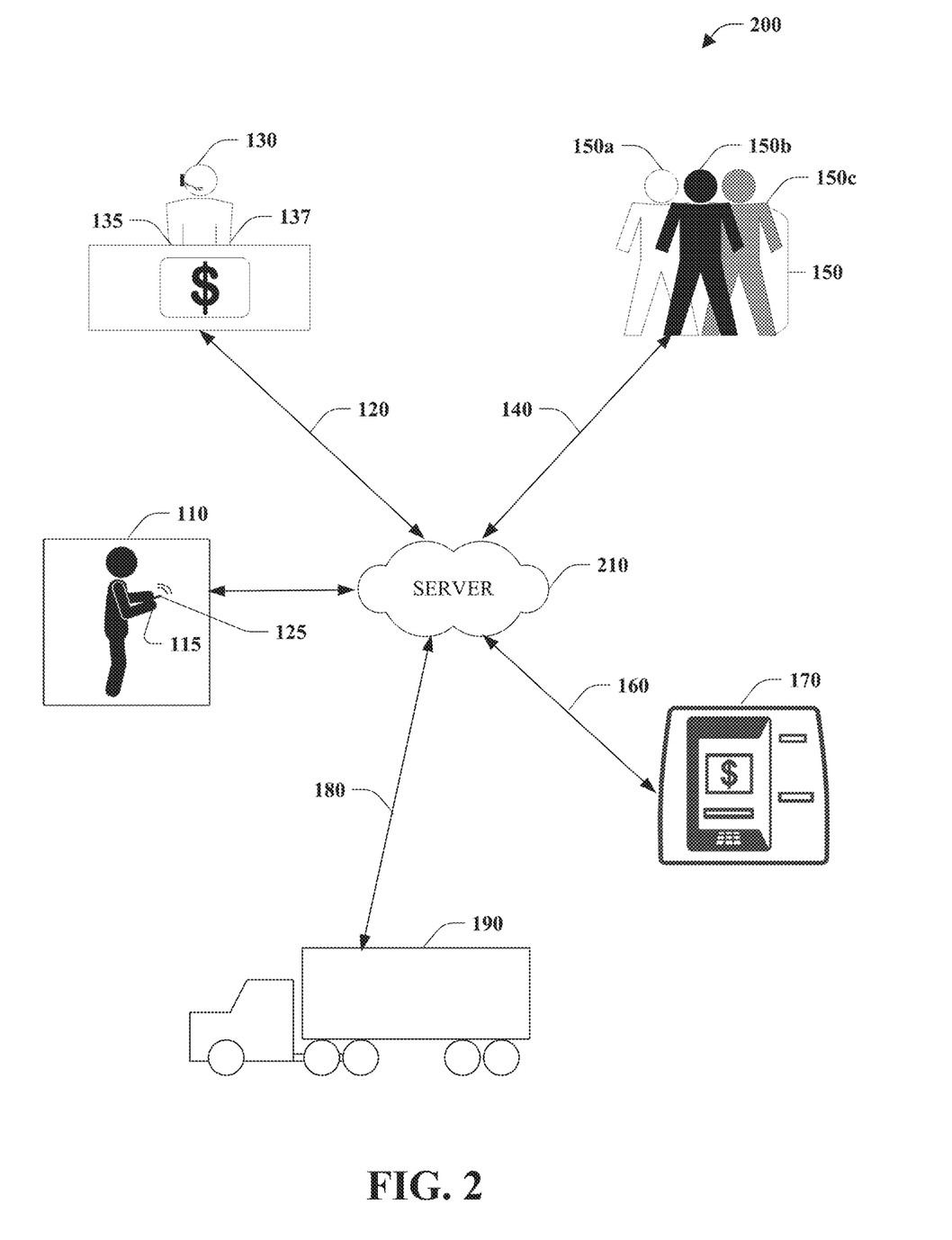
FIG. 2 illustrates an overview of another example implementation.

Communications in the contactless transactions 120, 140, 160, and 180 are transmitted directly between the electronic devices associated with the individuals and servicers involved. However, it is contemplated that communications in the contactless transactions 120, 140, 160, and 180 can be transmitted over a server. FIG. 2 illustrates an overview of another example implementation 200, which employs a server 210 over which the contactless transactions 120, 140, 160, and 180 can be transmitted. FIG. 2 illustrates the individual 110 in four separate contactless transactions similar to FIG. 1. However, in FIG. 2, communications in the contactless transactions 120, 140, 160, and 180 are not sent directly from device to device as in FIG. 1. In FIG. 2, communication is sent over the server 210, which can store, send, and receive data. The server 210 can be a local server or a cloud server. A local server can provide advantages such as enhanced processing power, storing large chunks of data, and freeing up memory. A cloud server can also provide additional advantages such as scalability and security, among other things.

In FIG. 2, communications between the individual 110 and the bank associate 130, the group 150 of individuals, the ATM 170, and the delivery person 190 are transmitted through the server 210. For example, communication from the bank associate 130 to the individual 110 is received by the server 210, which then sends the communication to the individual 110. The authentication process in FIG. 2 is otherwise similar to the authentication process in FIG. 1.

It is appreciated that the electronic device 125 can be a mobile device owned by and registered to the individual 110. However, it is contemplated that a managing entity such as a banking institution can also provide electronic devices at the banking institution for use by customers such as the individual 110 for transactions such as the contactless transaction 120. Similarly, the electronic device 137 can also be a mobile device owned by and registered to the bank associate 130. However, the electronic device 137 can also be an electronic device provided by the banking institution to the bank associate 130 for business purposes. For security reasons, it is contemplated that electronic devices are identified and associated with individuals in contactless transactions or with businesses for use by individuals (e.g., customers or employees providing services).

Figure 3:
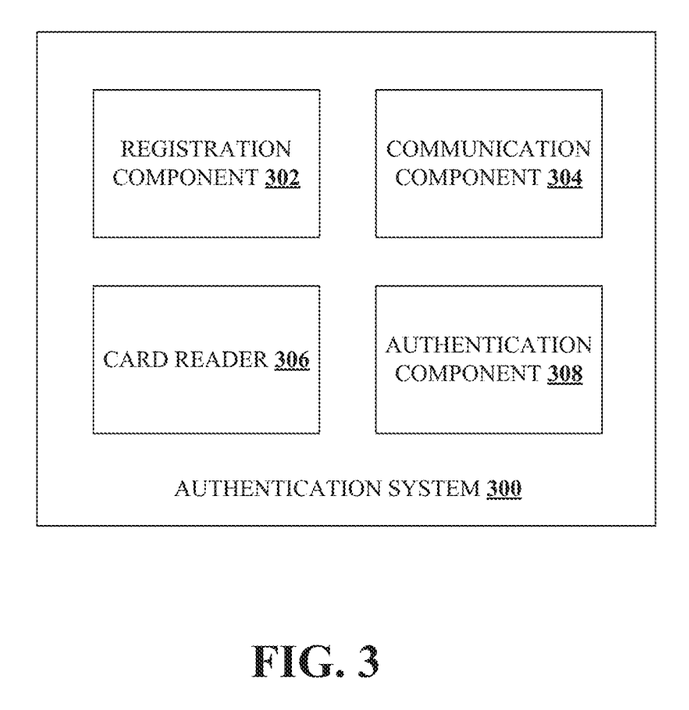
FIG. 3 is a block diagram illustrating an example authentication system.

FIG. 3 is a block diagram illustrating an example authentication system 300 comprising registration component 302, communication component 304, card reader 306, and authentication component 308. For sake of brevity, contactless transaction 120 is described in greater detail to illustrate the authentication process in other similar contactless transactions. The registration component 302 can register the chip-embedded card 115 to the individual 110 comprising identity information of the individual 110. The registration component 302 can also register chip-embedded card 135 to bank associate 130 comprising the identity information of the bank associate 130. Identity information of individuals can be associated with one or more managing entities if the individuals are servicers. For example, since the bank associate 130 is a servicer, the identity of the bank associate 130 can be associated with the bank (e.g., the managing entity) that employs the bank associate 130.

During a contactless transaction, the communication component 304 can transmit between an electronic device such as the electronic device 125 and one or more electronic devices such as the electronic device 137 data or requests for data comprising the identity information, biometric data, timestamp, geolocation data, or proximity data between the electronic device 125 and the one or more electronic devices (e.g., the electronic device 137). Bluetooth Low Energy beacon triangulation, geofence, or Wi-Fi can determine the proximity data. The biometric data can comprise photos or videos of the individual 110 or a servicer (e.g., bank associate 130).

The card reader 306 can read the chip-embedded card 115, if accessible during the contactless transaction, via the electronic device 125 for the identity information associated with the individual 110, the timestamp, the geolocation data, or the proximity data for validation of the physical presence of the individual 110. Similarly, the card reader 306 can read the chip-embedded card 135 via the electronic device 137 for the identity information associated with the bank associate 130, for example. Furthermore, the card reader 306 can read the chip-embedded card 135 associated with the bank associated 130 for the identity information associated with the bank associated 130 revealing the name of the managing entity (e.g., name of the employer). The card reader 306 can be a contact or contactless reader employing near-field communication (NFC).

If the bank associate 130 requests data from the individual 110, that request can be sent via the communication component 304. If the request is for biometric data that can include photos or videos of the individual 110 taken during the contactless transaction. However, biometric data can also include fingerprints and audio clips or audio recordings. In response to a request from the bank associate for a photo, the individual 110 can take a photo with the electronic device and transmit, via the communication component 304, the photo to the bank associate 130. Based on the data received, the bank associate can authenticate, via the authentication component 308, the contactless transaction, using the electronic device 137. In transactions where the servicer is a machine, such as in contactless transaction 160, authentication can be in the form of allowing access to an account associated with the transaction.

Figure 4:
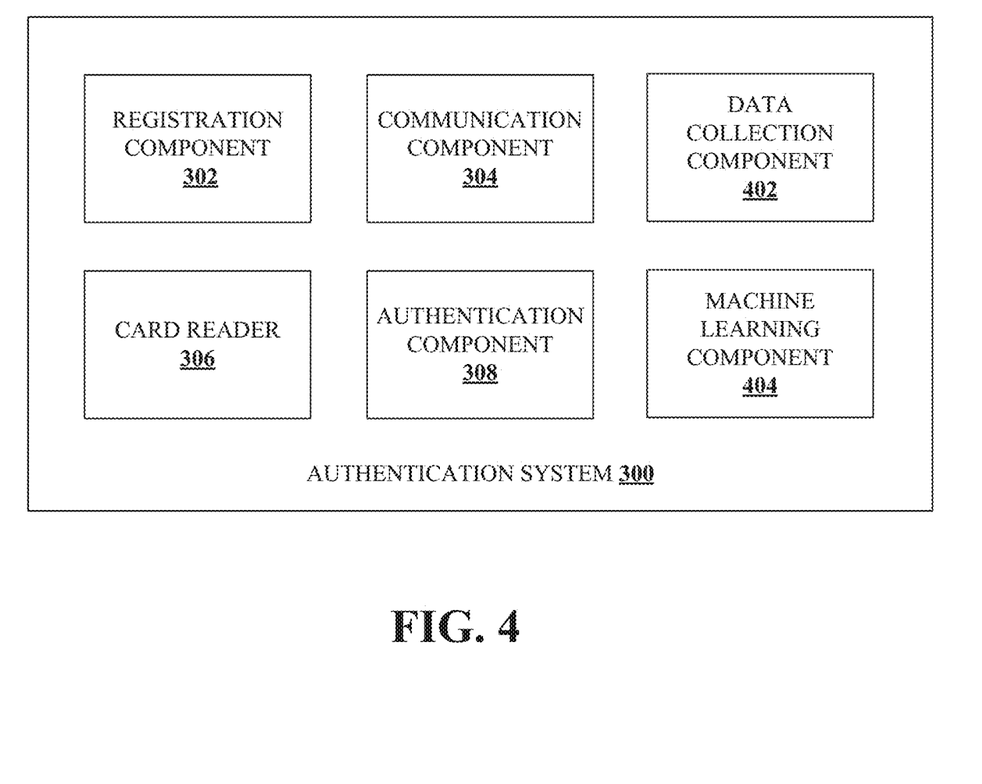
FIG. 4 is a block diagram illustrating another example authentication system.

FIG. 4 is a block diagram illustrating another example authentication system 300 further comprising data collection component 402 and machine learning component 404. The data collection component 402 can collect the data associated with the individual into the electronic device and collect requested data from the one or more electronic devices. For example, in response to a request from the bank associate 130 for biometric data such as a photo, the individual 110 can send a photo to the bank associate 130, which can be collected by the data collection component 402, which can be stored in the electronic device 137 or the server 210.

The machine learning component 404 can analyze the requested data to provide a confidence score. The confidence score can be determined based on the requested data or type of contactless transaction. For example, a clear photo can receive a higher confidence score than a photo that is not as clear. A video that reveals an individual's facial features and voice can receive a higher confidence score than a photo. As such, the machine learning component 404 can employ facial recognition and voice recognition. The machine learning component 404 can also employ handwriting recognition to detect whether a signature belongs to the individuals that the transaction binds. The confidence score can also be based on the type of contactless transaction. For example, the confidence score of a delivery service, such as in contactless transaction 180, can meet a predetermined threshold with not as much data required as compared to another transaction, such as a mortgage closing. In some instances, the confidence score can be based on a binary decision. In others, the confidence score can be a weight-based decision. For example, if the delivery truck in the contactless transaction 180 is not variable (e.g., identified or provided), the confidence score is based on a binary decision based on whether the delivery truck is or is not the identified delivery truck. The identity of the delivery person, however, can be variable based on the identity information provided by the delivery person. It is appreciated that the machine learning component 404 can extract the timestamp data, the geolocation data, and the proximity data from the transmitted communications and provide a confidence score for the validation of physical presence of individuals in a contactless transaction.

Figure 5:
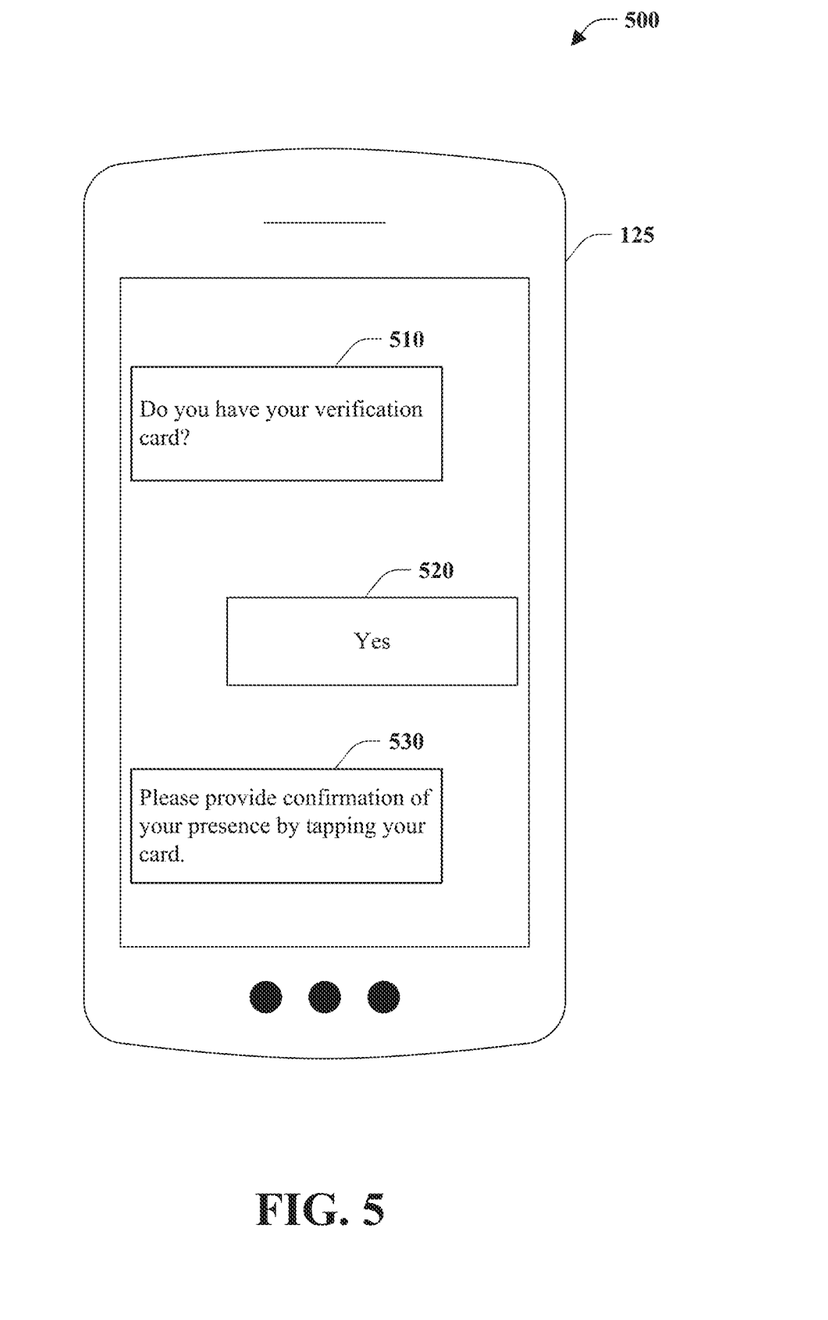
FIG. 5 illustrates an example user interface requesting confirmation of physical presence.
Figure 6:
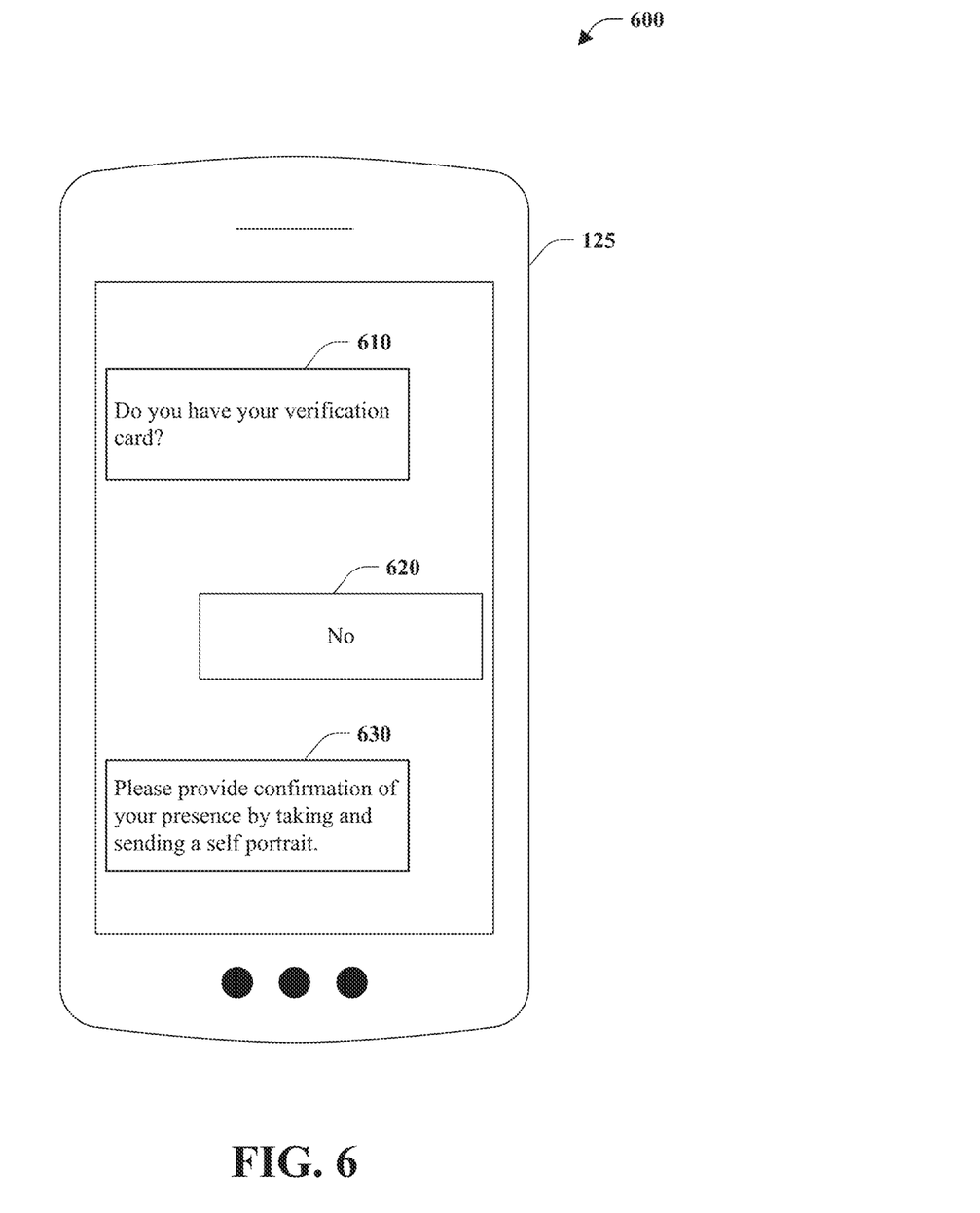
FIG. 6 illustrates another example user interface requesting confirmation of physical presence.

FIG. 5 illustrates an example user interface 500 requesting confirmation of physical presence. The electronic device 125 illustrated in FIGS. 5 and 6 is a mobile device. However, the electronic device 125 is not limited to a mobile device. For example, the electronic device 125 can be an electronic device provided inside a bank. In FIG. 5, as part of a contactless transaction, a request 510 can be sent from another electronic device, such as the electronic device 137 associated with the bank associate 130, to the electronic device 125 associated with the individual 110. The request 510 can ask the individual 110, "Do you have your verification card?" In this example, the individual 110 sent a reply 520 responding, "Yes." A follow-up request 530 can be sent to the individual 110 asking the individual 110 to, "Please provide confirmation of your presence by tapping your card."

In response to the request 530, the individual 110 can tap the chip-embedded card 115 to the electronic device 125 so the card reader 306 can read the chip-embedded card 115. In this non-limiting example, the card reader 306 is a contactless card reader that employs NFC for reading the chip-embedded card 115 (e.g., generally, card). Therefore, taping the chip-embedded card 115 to the electronic device 125 can read the information data registered to the chip-embedded card 115. For contactless card reading (e.g., not needing to insert or swipe a card), the NFC needs to be turned on or enabled on the electronic device 125 by the individual 110 to use this short-range wireless technology.

FIG. 6 illustrates another example user interface 600 requesting confirmation of physical presence. In example user interface 600, a request 610 can be sent to the individual 110 via the electronic device 125. The request 610 asks the individual 110, "Do you have your verification card?" In response, the individual 110 sent reply 620, responding, "No." A follow-up request 630 can be sent to the individual 110 to "Please provide confirmation of your presence by taking and sending a self-portrait." The request 630 is requesting biometric data in for form of a photo or a self-portrait to be taken during the contactless transaction. The photo can provide photo metadata that can include a timestamp, geolocation data, and information regarding the electronic device 125. This photo metadata can be utilized by the machine learning component 404 to determine a confidence score for the validation of physical presence of the individual 110 in a contactless transaction. Individuals in a contactless transaction can utilize the validation by the machine learning component 404 to authentication, via the authentication component 308, the contactless transaction, using the electronic device 137. For example, based on a confidence score satisfying a predetermined threshold, the machine learning component 404 can provide validation of the physical presence of the individual 110. The bank associate 130 can use the provided validation along with the bank associate 130's visual identification of the individual 110 to determine whether to authenticate the contactless transaction 120.

Figure 7:
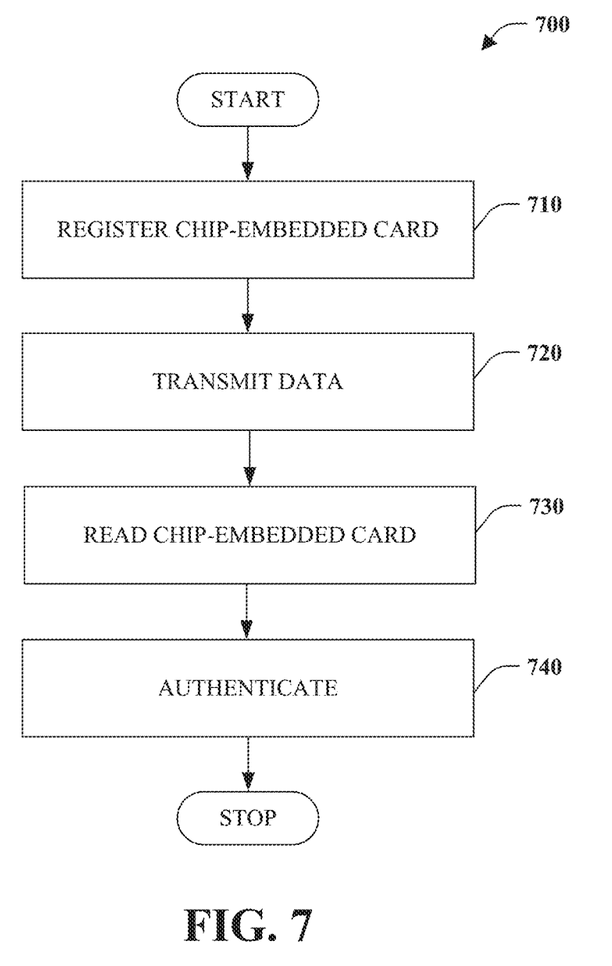
FIG. 7 is a flow diagram illustrating an authentication method of a contactless transaction in accordance with an embodiment.
Figure 8:
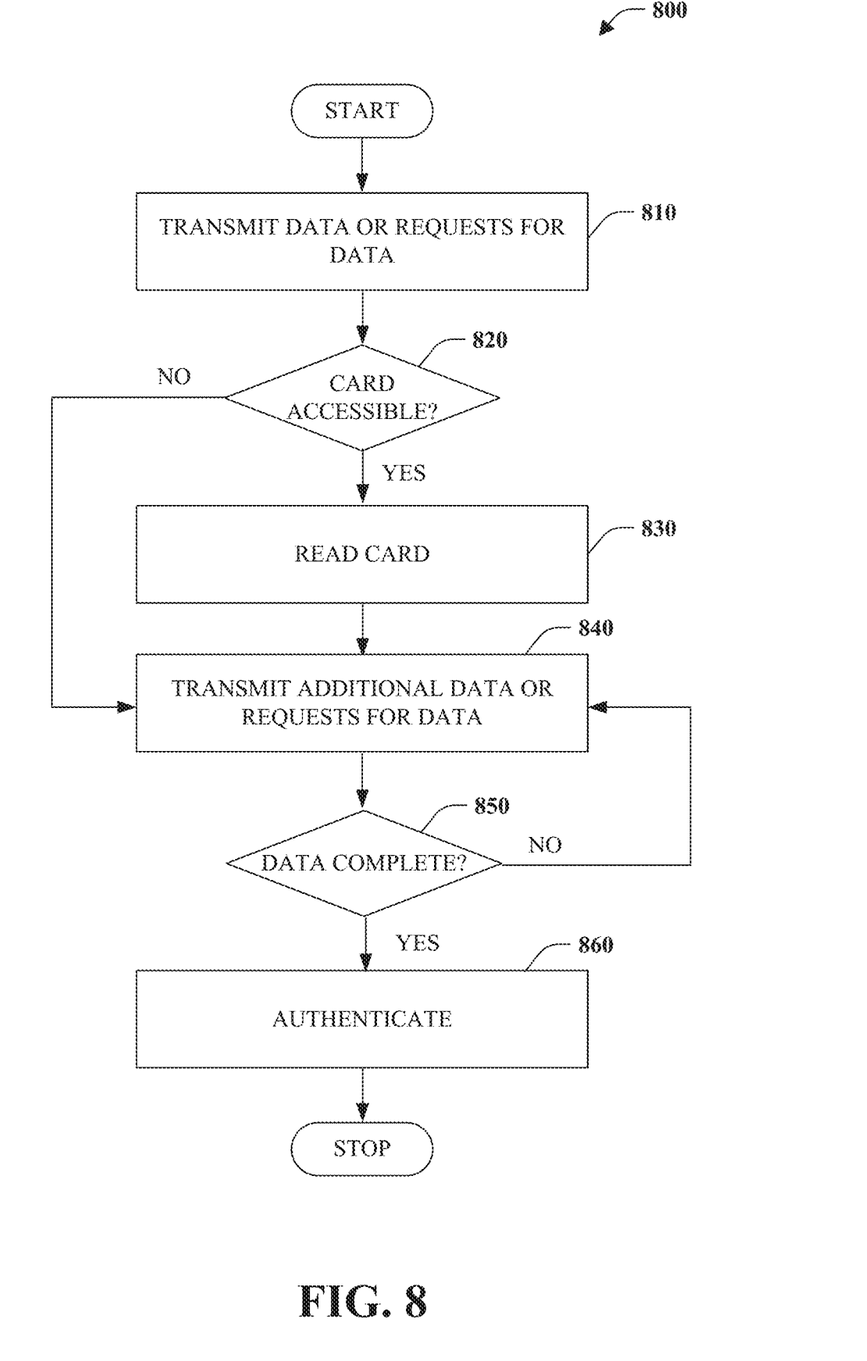
FIG. 8 is a flow diagram illustrating another authentication method of a contactless transaction based on accessibility of a registered chip-embedded card in accordance with an embodiment.

With reference to FIGS. 7 and 8, example authentication methods 700 and 800 are depicted. While, for purposes of simplicity of explanation, the methods show and describe a series of blocks, it is to be understood and appreciated that the disclosed subject matter is not limited by the order of the blocks, as some blocks may occur in different orders or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block. It is also appreciated that the authentication methods 700 and 800 are described in conjunction with specific examples solely for explanation purposes.

FIG. 7 is a flow diagram illustrating an authentication method 700 of a contactless transaction. At 710, the authentication method 700 can comprise registering, by the registration component 302, a chip-embedded card to an individual comprising identity information of the individual. At 720, during a contactless transaction, the authentication method 700 can comprise transmitting, by the communication component 304, between an electronic device and one or more electronic devices data or requests for data comprising the identity information, biometric data, timestamp, geolocation data, or proximity data between the electronic device and the one or more electronic devices. At 730, if accessible during the contactless transaction, the authentication method 700 can comprise reading, by the card reader 306, the chip-embedded card, via the electronic device or the one or more electronic devices, for the identity information, the timestamp, the geolocation data, or the proximity data for validation of physical presence. At 740, the authentication method 700 can comprise authenticating, via the authentication component 308, via the electronic device or the one or more electronic devices, the contactless transaction based on the data.

FIG. 8 is a flow diagram illustrating another authentication method 800 associated with a contactless transaction based on the accessibility of the registered chip-embedded card 115. At 810, the authentication method 800 can comprise transmitting, by the communication component 304, data or requests for data. At 820, the authentication method 800 can comprise determining, by the individual 110, whether the chip-embedded card 115 is accessible (e.g., available or present). If yes, the process continues to 830. If no, the process proceeds to 840. At 830, the authentication method 800 can comprise reading the chip-embedded card 115. At 840, the authentication method 800 can comprise transmitting additional data or requests for data. At 850, the authentication method 800 can comprise determining whether the data is complete. If yes, the process continues to 860. If no, the process proceeds to 840. At 860, the authentication method 800 can comprise authenticating the identity of the individual associated with the contactless transaction based on the data.

Using contactless transaction 120 as an example, based on the data transmitted from the electronic device 125 to the electronic device 137, the machine learning component 404 can provide validation of the physical presence of the individual 110 if the confidence score meets a predetermined threshold. The bank associate 130 can use the provided validation along with the bank associate 130's visual observations of the individual 110 and the contactless transaction 120. The bank associate can determine whether to authenticate the individual 110 associated with contactless transaction 120. Authentication from the bank associate 130 can be sent to the electronic device 125 by the electronic device 137 via the authentication component 308.

It is to be understood and appreciated that, while many of the embodiments described herein employ a chip-enabled card to establish contactless identity, other embodiments exist that employ additional identification data such as, but not limited to biometric data (e.g., fingerprints, facial recognition, voiceprints) together with (or alone) a chip-enabled card to establish contactless identity. For example, when a chip-enabled card is not available, biometric data together with (or separate from) mobile device identity/characteristics and contextual data can be employed to verify identity. In other aspects, additional data such as biometric data can be employed in addition to a chip-enabled card (device or fob) so as to establish identity, e.g., in scenarios where a higher level of identity verification is desired or required. These alternative embodiments are to be included within the spirit or scope of the innovation disclosed and claimed herein.

As used herein, the terms "component" and "system," as well as various forms thereof (e.g., components, systems, sub-systems) are intended to refer to a computer-related entity, either hardware, a combination of hardware and software, software, or software in execution. For example, a component may be but is not limited to being a process running on a processor, a processor, an object, an instance, an executable, a thread of execution, a program, or a computer. By way of illustration, both an application running on a computer and the computer can be a component. One or more components may reside within a process or thread of execution, and a component may be localized on one computer or distributed between two or more computers.

As used herein, the term "infer" or "inference" generally refer to the process of reasoning about or inferring states of a system, a component, an environment, or a user from one or more observations captured by way of events or data, among other things. Inference may be employed to identify a context or an action or may be used to generate a probability distribution over states, for example. An inference may be probabilistic. For example, computation of a probability distribution over states of interest can be based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several events and data sources.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 9:
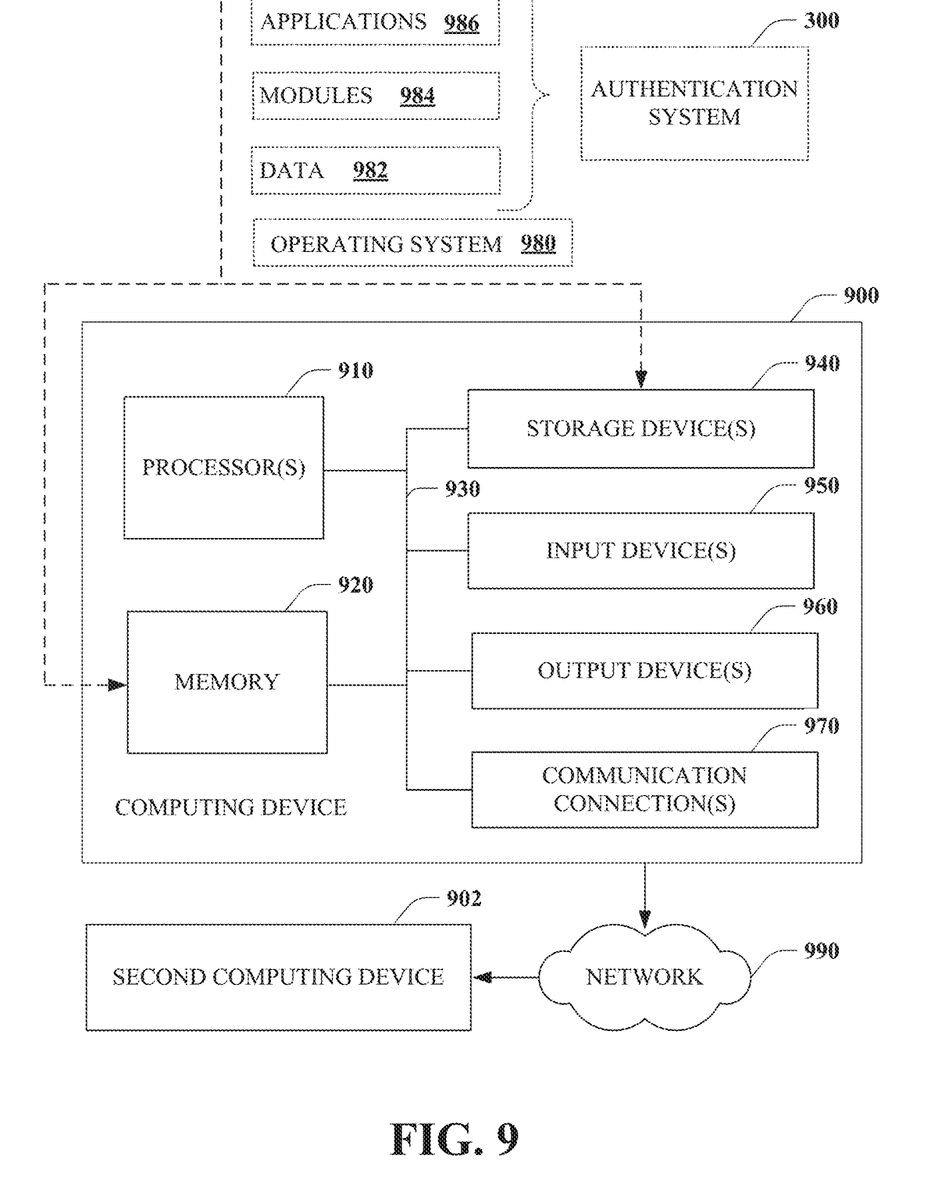
FIG. 9 is a block diagram illustrating a suitable operating environment for aspects of the subject disclosure.

To provide a context for the disclosed subject matter, FIG. 9, as well as the following discussion, are intended to provide a brief, general description of a suitable environment in which various aspects of the disclosed subject matter can be implemented. However, the suitable environment is solely an example and is not intended to suggest any limitation on scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things, that perform particular tasks or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all aspects, of the disclosed subject matter can be practiced on stand-alone computers. In a distributed computing environment, program modules may be located in one or both of local and remote memory devices.

With reference to FIG. 9, illustrated is an example computing device 900 (e.g., desktop, laptop, tablet, watch, server, hand-held, programmable consumer or industrial electronics, set-top box, game system, compute node, . . . ).

The computing device 900 includes one or more processor(s) 910, memory 920, system bus 930, storage device(s) 940, input device(s) 950, output device(s) 960, and communications connection(s) 970. The system bus 930 communicatively couples at least the above system constituents. However, the computing device 900, in its simplest form, can include one or more processors 910 coupled to memory 920, wherein the one or more processors 910 execute various computer-executable actions, instructions, and or components stored in the memory 920.

The processor(s) 910 can be implemented with a general-purpose processor, a digital signal processor (DSP), an application-specific integrated circuit (ASIC), a field-programmable gate array (FPGA) or other programmable logic, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 910 may also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 910 can be a graphics processor unit (GPU) that performs calculations concerning digital image processing and computer graphics.

The computing device 900 can include or otherwise interact with a variety of computer-readable media to facilitate control of the computing device to implement one or more aspects of the disclosed subject matter. The computer-readable media can be any available media accessible to the computing device 900 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storing information such as computer-readable instructions, data structures, program modules, or other data. Storage media includes storage devices such as memory devices (e.g., random access memory (RAM), read-only memory (ROM), electrically erasable programmable read-only memory (EEPROM)), magnetic storage devices (e.g., hard disk, floppy disk, cassettes, tape), optical disks (e.g., compact disk (CD), digital versatile disk (DVD)), and solid-state devices (e.g., solid-state drive (SSD), flash memory drive (e.g., card, stick, key drive)), or any other like mediums that store, as opposed to transmit or communicate, the desired information accessible by the computing device 900. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 920 and storage device(s) 940 are examples of computer-readable storage media. Depending on the configuration and type of computing device, the memory 920 may be volatile (e.g., random access memory (RAM)), non-volatile (e.g., read only memory (ROM), flash memory . . . ), or some combination of the two. By way of example, the basic input/output system (BIOS), including basic routines to transfer information between elements within the computing device 900, such as during start-up, can be stored in non-volatile memory, while volatile memory can act as external cache memory to facilitate processing by the processor(s) 910, among other things.

The storage device(s) 940 include removable/non-removable, volatile/non-volatile storage media for storage of vast amounts of data relative to the memory 920. For example, storage device(s) 940 include, but are not limited to, one or more devices such as a magnetic or optical disk drive, floppy disk drive, flash memory, solid-state drive, or memory stick.

Memory 920 and storage device(s) 940 can include, or have stored therein, operating system 980, one or more applications 986, one or more program modules 984, and data 982. The operating system 980 acts to control and allocate resources of the computing device 900. Applications 986 include one or both of system and application software and can exploit management of resources by the operating system 980 through program modules 984 and data 982 stored in the memory 920 or storage device(s) 940 to perform one or more actions. Accordingly, applications 986 can turn a general-purpose computer 900 into a specialized machine in accordance with the logic provided thereby.

All or portions of the disclosed subject matter can be implemented using standard programming or engineering techniques to produce software, firmware, hardware, or any combination thereof to control the computing device 900 to realize the disclosed functionality. By way of example and not limitation, all or portions of the authentication system 300 can be, or form part of, the application 986, and include one or more modules 984 and data 982 stored in memory or storage device(s) 940 whose functionality can be realized when executed by one or more processor(s) 910.

In accordance with one particular embodiment, the processor(s) 910 can correspond to a system on a chip (SOC) or like architecture including, or in other words integrating, both hardware and software on a single integrated circuit substrate. Here, the processor(s) 910 can include one or more processors as well as memory at least similar to the processor(s) 910 and memory 920, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the authentication system 300 or functionality associated therewith can be embedded within hardware in a SOC architecture.

The input device(s) 950 and output device(s) 960 can be communicatively coupled to the computing device 900. By way of example, the input device(s) 950 can include a pointing device (e.g., mouse, trackball, stylus, pen, touchpad), keyboard, joystick, microphone, voice user interface system, camera, motion sensor, and a global positioning satellite (GPS) receiver and transmitter, among other things. The output device(s) 960, by way of example, can correspond to a display device (e.g., liquid crystal display (LCD), light emitting diode (LED), plasma, organic light-emitting diode display (OLED)), speakers, voice user interface system, printer, and vibration motor, among other things. The input device(s) 950 and output device(s) 960 can be connected to the computing device 900 by way of wired connection (e.g., bus), wireless connection (e.g., Wi-Fi, Bluetooth), or a combination thereof.

The computing device 900 can also include communication connection(s) 970 to enable communication with at least a second computing device 902 utilizing a network 990. The communication connection(s) 970 can include wired or wireless communication mechanisms to support network communication. The network 990 can correspond to a local area network (LAN) or a wide area network (WAN) such as the Internet. The second computing device 902 can be another processor-based device with which the computing device 900 can interact. In one instance, the computing device 900 can execute an authentication system 300 for a first function, and the second computing device 902 can execute an authentication system 300 for a second function in a distributed processing environment. Further, the second computing device can provide a network-accessible service that stores source code, and encryption keys, among other things that can be employed by the authentication system 300 executing on the computing device 900.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system, comprising:
  a processor coupled to a memory that includes instructions that, when executed by the processor, cause the processor to:
    register a chip-embedded card that includes first identity data of an individual;
    request, during a contactless transaction, second identity data regarding the individual from a computing device, wherein the second identity data comprises at least one of biometric data, a timestamp, or geolocation of the computing device;
    read from the chip-embedded card the first identity data comprising at least one of biometric data, timestamp, or geolocation data of the chip-embedded card;
    compare the first identity data and the second identity data; and
    authenticate an identity of the individual for the contactless transaction based on a result of the compare when a match exists between the first identity data and the second identity data
  wherein geolocation data comprises proximity data determined by short-range wireless technology triangulation or fencing.

2. The system of claim 1, wherein the chip-embedded card is read by a contactless card reader.

3. The system of claim 1, wherein the biometric data comprises a fingerprint, facial scan, voiceprint, or photo or video of the individual.

4. The system of claim 1, wherein the instructions further cause the processor to collect the second identity data received in response to the request from one or more computing devices.

5. The system of claim 1, wherein the instructions further cause the processor to:
   compute a confidence score based on the first identity data and the second identity data; and
   determine the match when the confidence score satisfies a predetermined threshold.

6. The system of claim 5, wherein the predetermined threshold is based on requested data or a type of the contactless transaction.

7. A method, comprising:
   executing, on a processor, instructions that cause the processor to perform operations associated with contactless authentication, the operations comprising:
   requesting first identity data from an individual associated with a contactless interaction;
   requesting presentation of a chip-embedded card registered to the individual and comprising second identity data associated with the individual;
   comparing the first identity data and the second identity data;
   determining physical location based on at least one of the first identity data and the second identity data; and
   validating the identity of the individual when a result of the comparing operation is a match and the physical location is within a predetermined distance from another individual engaging in the contactless interaction.

8. The method of claim 7, the operations further comprising determining the match when similarity between the first identity data and the second identity data satisfies a predetermined threshold.

9. The method of claim 7, the operations further comprising determining a confidence score based on the first identity data and the second identity data, wherein the confidence score captures quantity and strength of provided identity data.

10. The method of claim 9, the operations further comprising preventing validation of the identity when the confidence score satisfies a predetermined threshold.

11. The method of claim 10, the operations further comprising preventing the validation when the confidence score satisfies a predetermined threshold determined based on a type of interaction.

12. The method of claim 10, the operations further comprising preventing the validation when the confidence score satisfies a predetermined threshold determined based a requested data.

13. The method of claim 7, the operations further comprising reading the chip-embedded card with a contactless reader.

14. The method of claim 7, the operations further comprising requesting the first identity data from a smartphone.

15. The method of claim 7, the operations further comprising determining the physical location based on global positioning system coordinates associated with a smartphone.

16. The method of claim 7, the operations further comprising extracting the physical location from metadata of one of an image or video provided by a smartphone as first identity data.

17. The method of claim 7, the operations further comprising determining the physical location from proximity data associated with short-range wireless technology triangulation or fencing.

18. A computer-implemented method, comprising:
   receiving first identity information from a smartphone of an individual associated with a contactless interaction;
   acquiring second identity information from a chip-embedded card for an individual from a contactless card reader;
   determining a location of the individual based on at least one of location information from the first identity information or a location of the contactless card reader;
   comparing the first identity information to the second identity information to determine whether there is a match or mismatch;
   determining a confidence score based on an amount and type of identity information available when there is a match; and
   authenticating an identity of the individual when the confidence score satisfies a predetermined threshold and the location is a predetermined distance from another entity engaging in the contactless interaction.

19. The computer-implemented method of claim 18, further comprising authenticating the identity of the individual when the confidence score satisfies a predetermined threshold that is based on a type of interaction.

\* \* \* \* \*